United States Patent
Kline

(10) Patent No.: US 9,077,745 B1
(45) Date of Patent: Jul. 7, 2015

(54) METHOD OF RESOLVING PORT BINDING CONFLICTS, AND SYSTEM AND METHOD OF REMOTE VULNERABILITY ASSESSMENT

(75) Inventor: Samuel A. Kline, Potomac, MD (US)

(73) Assignee: Saint Corporation, Bethesda, MD (US)

( * ) Notice: Subject to any disclaimer, the term of this patent is extended or adjusted under 35 U.S.C. 154(b) by 646 days.

(21) Appl. No.: 12/850,274

(22) Filed: Aug. 4, 2010

(51) Int. Cl.
H04L 29/06 (2006.01)

(52) U.S. Cl.
CPC .................................. H04L 63/1433 (2013.01)

(58) Field of Classification Search
CPC .......................... H04L 63/1433; G06F 21/577
USPC .................. 726/15, 21–25; 713/188
See application file for complete search history.

(56) References Cited

U.S. PATENT DOCUMENTS

| | | | |
|---|---|---|---|
| 5,892,903 A | 4/1999 | Klaus | |
| 6,059,838 A * | 5/2000 | Fraley et al. | 717/108 |
| 6,871,284 B2 | 3/2005 | Cooper et al. | |
| 6,965,928 B1 * | 11/2005 | Cox et al. | 709/220 |
| 7,003,561 B1 | 2/2006 | Magdych et al. | |
| 7,058,604 B2 | 6/2006 | Kurumida | |
| 7,073,198 B1 * | 7/2006 | Flowers et al. | 726/25 |
| 7,096,503 B1 * | 8/2006 | Magdych et al. | 726/25 |
| 7,152,105 B2 | 12/2006 | McClure et al. | |
| 7,162,509 B2 * | 1/2007 | Brown et al. | 709/201 |
| 7,162,742 B1 | 1/2007 | Flowers et al. | |
| 7,178,166 B1 * | 2/2007 | Taylor et al. | 726/25 |
| 7,346,929 B1 * | 3/2008 | Hammond | 726/25 |
| 7,403,535 B2 * | 7/2008 | Modi et al. | 370/401 |
| 7,673,043 B2 | 3/2010 | Keir et al. | |
| 7,702,750 B2 * | 4/2010 | Momtchilov et al. | 709/219 |
| 8,752,183 B1 * | 6/2014 | Heiderich et al. | 726/25 |
| 8,931,087 B1 * | 1/2015 | Day et al. | 726/22 |
| 2003/0014669 A1 * | 1/2003 | Caceres et al. | 713/201 |
| 2004/0015961 A1 | 1/2004 | Chefalas et al. | |
| 2004/0088700 A1 | 5/2004 | Lee et al. | |
| 2005/0005169 A1 * | 1/2005 | Kelekar | 713/201 |
| 2006/0075080 A1 * | 4/2006 | Burr et al. | 709/223 |

(Continued)

OTHER PUBLICATIONS

Henning; Vulnerability assessment in wireless networks; Published in: Applications and the Internet Workshops, 2003; Proceedings. 2003 Symposium on; Date of Conference: Jan. 27-31, 2003; pp. 358-362; IEEE Xplore.*

(Continued)

*Primary Examiner* — Bradley Holder
(74) *Attorney, Agent, or Firm* — Eckert Seamans Cherin & Mellott, LLC; Philip E. Levy

(57) ABSTRACT

A system includes a client system, a server, and a communication network providing communications between the client system and the server. The server is structured to provide remote vulnerability assessment for a subscriber at the client system, and to accept credentials of the subscriber at the client system and responsively grant access to an account manager on the server. The server is further structured to generate a license key operatively associated with the remote vulnerability assessment for the subscriber and provide the license key to the client system. The server is further structured to accept input from the client system to request a user interface for running remote vulnerability assessments, prepare a software instance of vulnerability analysis software, synchronize the license key and the credentials within the account manager, authenticate the subscriber and redirect the client system to the user interface.

13 Claims, 9 Drawing Sheets

(56) References Cited

U.S. PATENT DOCUMENTS

| | | | |
|---|---|---|---|
| 2006/0101518 A1* | 5/2006 | Schumaker et al. | 726/25 |
| 2006/0101519 A1* | 5/2006 | Lasswell et al. | 726/25 |
| 2006/0101520 A1* | 5/2006 | Schumaker et al. | 726/25 |
| 2006/0272011 A1* | 11/2006 | Ide et al. | 726/5 |
| 2007/0192867 A1* | 8/2007 | Miliefsky | 726/25 |
| 2008/0025297 A1* | 1/2008 | Kashyap | 370/389 |
| 2008/0098479 A1 | 4/2008 | O'Rourke et al. | |
| 2008/0209566 A1 | 8/2008 | Ziv | |
| 2009/0007270 A1 | 1/2009 | Futoransky et al. | |
| 2009/0126018 A1 | 5/2009 | Keohane et al. | |
| 2009/0177740 A1 | 7/2009 | Curren | |
| 2009/0178139 A1 | 7/2009 | Stute et al. | |
| 2009/0187995 A1 | 7/2009 | Lopatic | |
| 2009/0205047 A1 | 8/2009 | Podjarny | |
| 2009/0205055 A1 | 8/2009 | Savov | |
| 2009/0259748 A1 | 10/2009 | McClure et al. | |
| 2009/0328190 A1 | 12/2009 | Liu et al. | |
| 2010/0049792 A1 | 2/2010 | Hao et al. | |
| 2011/0296175 A1* | 12/2011 | Shin | 713/164 |

OTHER PUBLICATIONS

Budynek et al; Evolving computer intrusion scripts for vulnerability assessment and log analysis; Published in: Proceeding GECCO '05 Proceedings of the 7th annual conference on Genetic and evolutionary computation; 2005; pp. 1905-1912; ACM Digital Library.*

Saint Corporation, "Integrated Network Vulnerability Scanning and Penetration Testing", www.saintcorporation.com, 2009, pp. 1-15.

Saint Corporation, "Running a Default Vulnerability Scan, A Step-by-Step Guide", www.saintcorporation.com, 2010, pp. 1-11.

* cited by examiner

METHOD OF RESOLVING PORT BINDING CONFLICTS, AND SYSTEM AND METHOD OF REMOTE VULNERABILITY ASSESSMENT

BACKGROUND

1. Field

The disclosed concept pertains generally to vulnerability assessment and, more particularly, to methods of remote vulnerability assessment. The disclosed concept also pertains to methods of resolving port binding conflicts. The disclosed concept further pertains to systems for vulnerability assessment.

2. Background Information

Proactive network security attempts to find holes in a network before attackers do. Vulnerability scanning helps to protect against both external threats, such as attackers and worms, and internal threats, such as malicious users within a network. A network scanner detects vulnerabilities which are or might be present.

Known vulnerability analysis software scans a network to detect various vulnerabilities that could allow an attacker to gain unauthorized access, create a denial-of-service, or gain sensitive information about the network. This can include, for example, network vulnerability assessment, automated penetration testing, client-side penetration testing, Payment Card Industry (PCI) compliance, content search, and professional report generation capabilities. The vulnerability analysis software can also include a number of exploit tools, which perform related information gathering and social engineering tasks, such as phishing and flash drive autoplay execution. Licenses can include the ability to test individual Internet Protocol (IP) addresses, full networks, or both. Both static licenses, which allow testing of a fixed set of IP addresses, and dynamic licenses, which allow testing of a variable set of IP addresses, are available.

Every live system on a network can be screened for Transmission Control Protocol (TCP) and User Datagram Protocol (UDP) services. For each service found running, a set of probes can be launched designed to detect known vulnerabilities. In addition to detecting vulnerabilities, the vulnerability analysis software can give the user the ability to fix weaknesses in network security before they can be exploited by intruders. The user can be provided with vulnerability information and links, in order to download patches or new versions of the software that will eliminate the detected vulnerabilities.

Known vulnerability analysis products run in a remote mode on a client system. FIGS. 1A-1B show a vulnerability analysis remote mode set-up process 2. For example, at 4, if a subscriber (a new customer) is not yet subscribed to a vulnerability analysis product, then they submit a purchase request (e.g., purchase order by facsimile or e-mail) for the product, specifying desired license parameters. Then, at 6, the vendor of that product sends the subscriber an account login ID and password. At 8, the subscriber uses the account login ID and password to access a personalized account manager interface (not shown) on the vendor's web server (not shown). Then, at 10, if payment (e.g., credit card; debit card) is pending, the subscriber clicks on a "Submit Payment" option to complete payment at 12.

Otherwise, or after 12, if this is the first time the subscriber logs in, at 14, then, at 16, the subscriber clicks on a "New Key" option to access a user interface for generating a license key. Next, at 18, the subscriber enters the number of IP addresses for test, and submits, at 20, a web form to register the number of IP addresses. The IP addresses can be, for example, network addresses or individual host addresses, depending on the license parameters. Then, at 22, the vendor's web server processes the request and presents the subscriber with a new license key through the user interface.

On the other hand, if at 14 it is determined that the subscriber had previously logged in, then, at 24, it is determined if the subscriber has a static license and needs to add a number of IP addresses to a corresponding license key. If so, then step 16 follows. Otherwise, or after 22, the subscriber clicks on a "Download" button, at 26, to download a program corresponding to desired vulnerability analysis software onto the client system (not shown). Then, at 28, the subscriber runs the downloaded program to install the vulnerability analysis software on the client system. Next, at 30, the subscriber starts the vulnerability analysis software in the remote mode, and sets authentication credentials (authentication passwords) when prompted. At 32, the vulnerability analysis software spawns an HTTP daemon listening on a specified port, and accepts connections from specified client IP addresses. Then, at 34, the subscriber connects to the HTTP daemon using a conventional web browser on the authorized client system. Next, at 36, the subscriber enters the previously set authentication credentials and is responsively granted access to a web interface of the vendor's web server. Then, at 38, the subscriber chooses "Configure Key" option from an administrative functions menu. Finally, at 40, the subscriber "pastes" the previously provided license key into a text entry field. This permits a previously existing vulnerability analysis software product to run in a remote (user interface) mode on a client system. Alternatively, the software can run locally on the user's desktop as well. Remote mode refers to the user interface. This allows the user to control the application which is running on a different computer than the one the user is interacting with.

The results of a scan depend on the placement of the scanner. A vulnerability can only be detected if the scanner has access to the vulnerable service. Since scanning through a router or firewall could hide internal vulnerabilities, it is best to place the scanner inside the firewall so it can scan for both internal and external vulnerabilities. This refers to the placement of the software and is not dependent on the user interface mode.

When running vulnerability analysis software in a remote mode on a client system, several functions (e.g., without limitation, reverse-shell exploit payloads; exploit servers; file transfers) have exclusive access to certain ports on the client system. However, this would present a problem if multiple instances of that software were to be run on the same server.

There is room for improvement in systems and methods of remote vulnerability assessment.

SUMMARY

These needs and others are met by embodiments of the disclosed concept, which resolve port binding conflicts of a server, and/or which generate a license key operatively associated with remote vulnerability assessment for a subscriber, provide the license key to a client system, accept input at a server from the client system to request a user interface for running vulnerability assessments, prepare a software instance of vulnerability analysis software at the server, synchronize the license key and credentials of the subscriber within the account manager of the server, and authenticate the subscriber and redirect the client system to the user interface.

In accordance with one aspect of the disclosed concept, a method resolves port binding conflicts of a server comprising a plurality of ports and a physical network interface. The method comprises: creating by the server a plurality of virtual network interfaces on the physical network interface; assigning a unique IP address to each of the virtual network interfaces; starting a software instance by the server and responsively assigning a corresponding one of the virtual network interfaces to the software instance on the server; and performing an action requiring binding to one of the plurality of ports of the server and responsively binding the action to the unique IP address of the corresponding one of the virtual network interfaces.

As another aspect of the disclosed concept, a method is for remote vulnerability assessment by a server for a subscriber at a client system. The method comprises: accepting credentials of the subscriber at the client system and responsively granting access to an account manager on the server; generating by the server a license key operatively associated with the remote vulnerability assessment for the subscriber; providing the license key to the client system; accepting input at the server from the client system to request a user interface for running vulnerability assessments; preparing a software instance of vulnerability analysis software at the server; synchronizing the license key and the credentials within the account manager of the server; and authenticating the subscriber and redirecting the client system to the user interface.

As another aspect of the disclosed concept, a system comprises: a client system; a server; and a communication network providing communications between the client system and the server, wherein the server is structured to provide remote vulnerability assessment for a subscriber at the client system, wherein the server is further structured to accept credentials of the subscriber at the client system and responsively grant access to an account manager on the server, wherein the server is further structured to generate a license key operatively associated with the remote vulnerability assessment for the subscriber and provide the license key to the client system, and wherein the server is further structured to accept input from the client system to request a user interface for running remote vulnerability assessments, prepare a software instance of vulnerability analysis software, synchronize the license key and the credentials within the account manager, authenticate the subscriber and redirect the client system to the user interface.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1A:
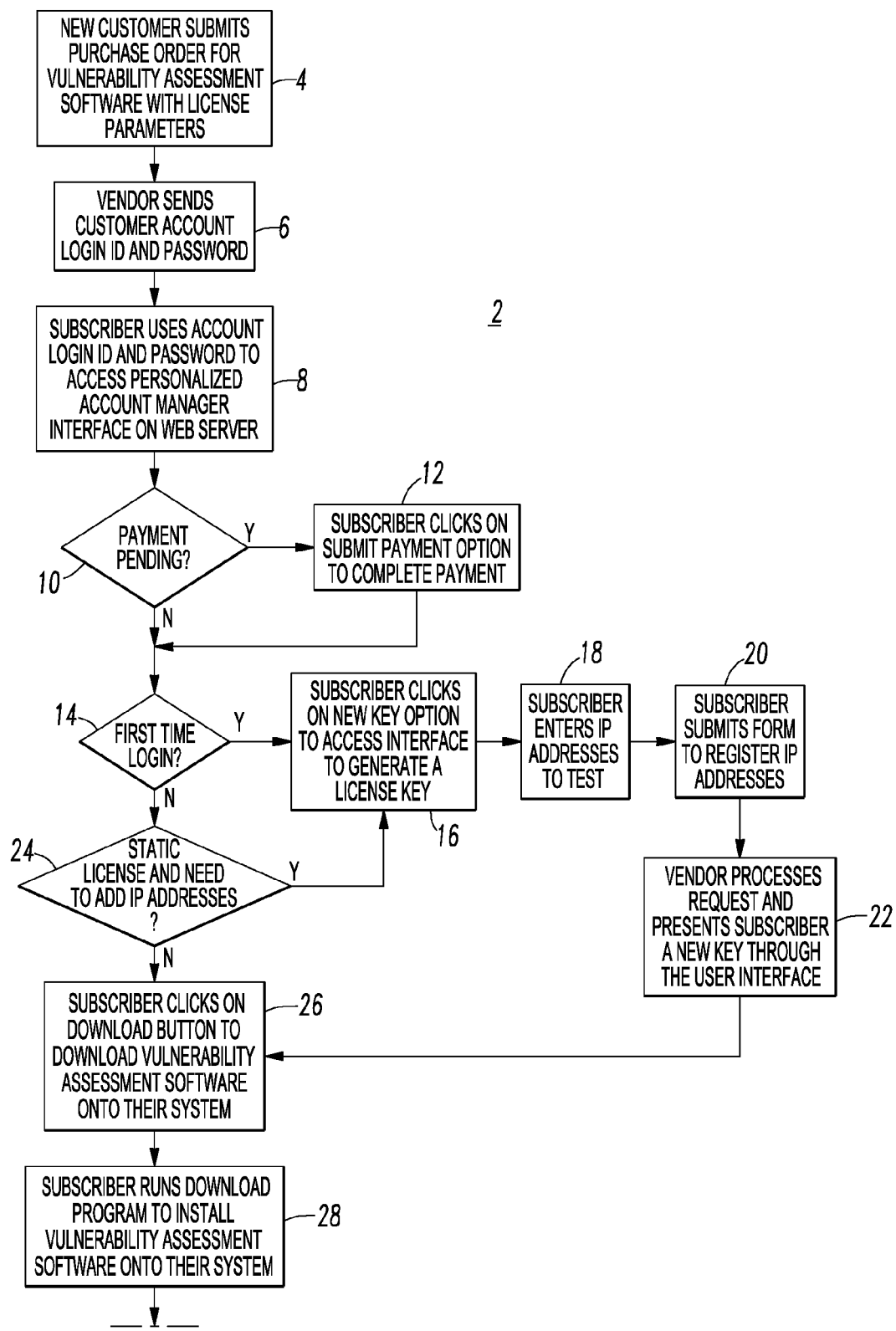
FIGS. 1A-1B form a flowchart of a vulnerability analysis remote mode set-up process.
Figure 1B:
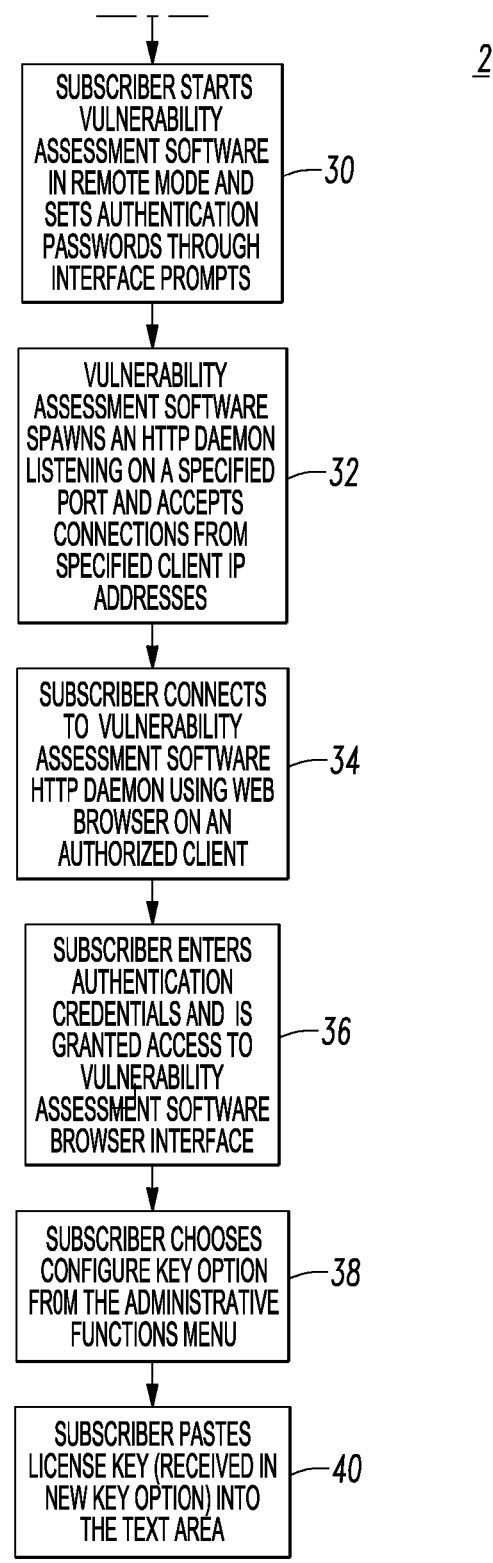

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a client device or system; a server; a networked processor; or any suitable processing device or apparatus.

As employed herein, the term "virtual network interface" shall mean a representation of a computer network interface that may or may not correspond directly to a physical network interface.

As employed herein, the term "physical network interface" shall mean a structure employed by a client, a server or another processor to access a communication network.

As employed herein, the term "port" shall mean a logical connection place associated with one network interface (either physical or virtual) or all network interfaces (either physical or virtual) by a software instance and identified by a "port number".

As employed herein, the term "IP address" shall mean a numerical value or label assigned to a node (device) participating in a communication network that uses the Internet Protocol for communication between its nodes (devices); or a host or network interface identification or location address.

As employed herein, the term "software instance" shall mean a process running on a server, a set of instructions executed by a server, or a program or section of a program simultaneously running as one of a plurality of instances on a server.

As employed herein, the term "binding" shall mean associating an action to a port of a physical network interface, or to an IP address. Normally, binding is done to a socket address (meaning an IP address in combination with a port). In aspects of the disclosed concept, there is a one-to-one correspondence between network interfaces and IP addresses, and there is binding to a port on a network interface.

As employed herein, the term "license key" shall mean a product key or other software-based key for a software instance, such as a computer program. For example, the license key can enforce license limits and expiration when a scan is requested. The software instance can be activated by entering the license key.

A client-server system partitions tasks or workloads between a number of servers (service providers), and a number of clients (service requesters or client systems). Often clients and servers communicate over a computer network on separate hardware, but both client and server may reside in the same system. A server is a host running a number of software instances, such as a server program that shares its resources with a number of clients. A client does not share any of its resources, but requests a server's content or service function. A client can initiate communication with a server, which awaits or listens for incoming client requests.

The disclosed concept is described in association with an example vulnerability assessment system, although the disclosed concept is applicable to a wide range of vulnerability assessment systems and methods.

The disclosed concept can provide, for example, a Security as a Service (SaaS) solution whereby a subscriber can conduct vulnerability assessment, penetration testing, and content searching activities from a server which is owned and maintained by a vendor. This provides the subscriber with a web interface to a remotely hosted (with respect to the subscriber's client system), fully functional version of known vulnerability analysis products that, otherwise, run in a remote mode on a client system.

The disclosed concept can tie into an account manager interface on a vendor's web site, in order that a subscriber need only employ one login and password, and then automatically install license keys. This is contrasted with known prior products, where a subscriber needs to remember two passwords (one password for the account manager on the vendor's web site, and another password for the vulnerability analysis product that runs in the remote mode on the client system). With the disclosed concept, the subscriber only needs to generate his/her own license key, and it is installed in the software automatically.

Figure 2:
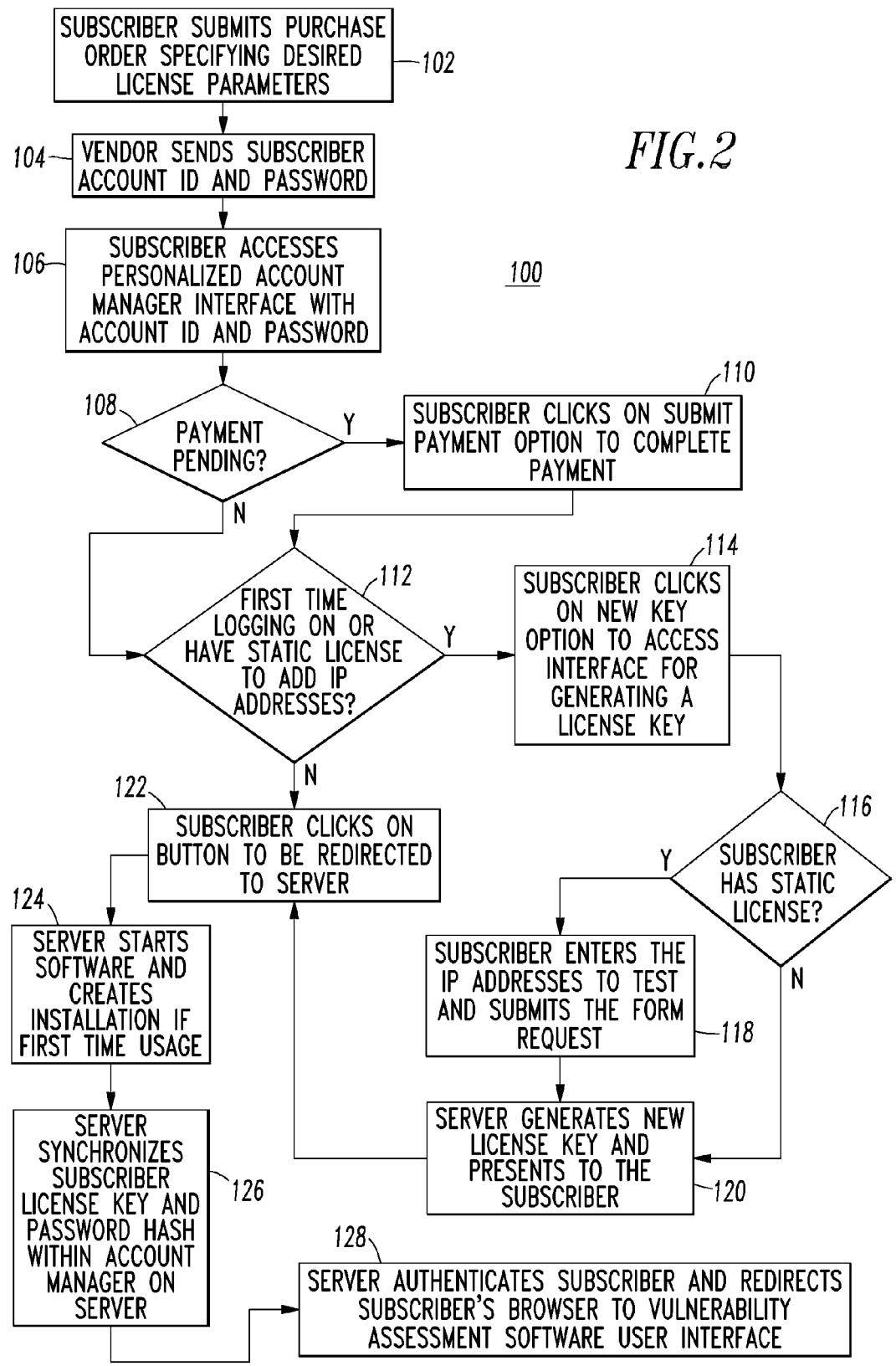
FIG. 2 is a flowchart of a vulnerability analysis set-up process in accordance with embodiments of the disclosed concept.

Referring to FIG. 2, a vulnerability analysis set-up process 100 is shown. First, at 102, if a subscriber is not yet subscribed to SaaS vulnerability assessment, the subscriber submits a purchase order specifying desired license parameters. Then, at 104, the vendor sends the subscriber an account ID and password. Next, at 106, the subscriber uses the account ID and password to access a personalized account manager interface (not shown) through a vendor's server (not shown, but see the server 608 of FIG. 7). Next, at 108, it is determined if a payment (e.g., credit card; debit card) is pending. If so, then at 110, the subscriber clicks on a "Submit Payment" option to complete payment. Otherwise, or after 110, at 112, if this is the first time the subscriber logs on, or if the subscriber has a static license and wishes to add IP addresses to his/her license key, then at 114, the subscriber clicks on a "New Key" option to access a user interface (not shown) for generating a license key. Then, at 116, the user interface determines if the subscriber has a static license. If so, then at 118, the subscriber enters the number of IP addresses to test, and submits a form request. For example, the number of IP addresses can be network addresses or individual host addresses, depending on the license parameters. Otherwise, or after 118, at 120, the server generates a new license key and presents the same to the subscriber through the user interface. The license key is shown as a verification for the user that this key was created with the requested parameters.

After 120, or if the test failed at 112, at 122, the subscriber clicks on a button which redirects the subscriber to the server. This provides the license key back to the server. Next, at 124, the server prepares the subscriber's installation of the SaaS vulnerability analysis software, including creating the installation if this is the first time using it, and starting the software if it is not already running. Then, at 126, the server synchronizes the subscriber's license key and password hash within the account manager of the server. This copies the license key from the account manager to the user's software instance. Finally, at 128, the server authenticates the subscriber and redirects the web browser (not shown) of the subscriber's client system (not shown, but see the client request host 602 of FIG. 7) to a vulnerability analysis user interface (not shown). From that point, the vulnerability analysis user interface conducts vulnerability assessment, penetration testing, and content searching activities from the server.

Figure 3:
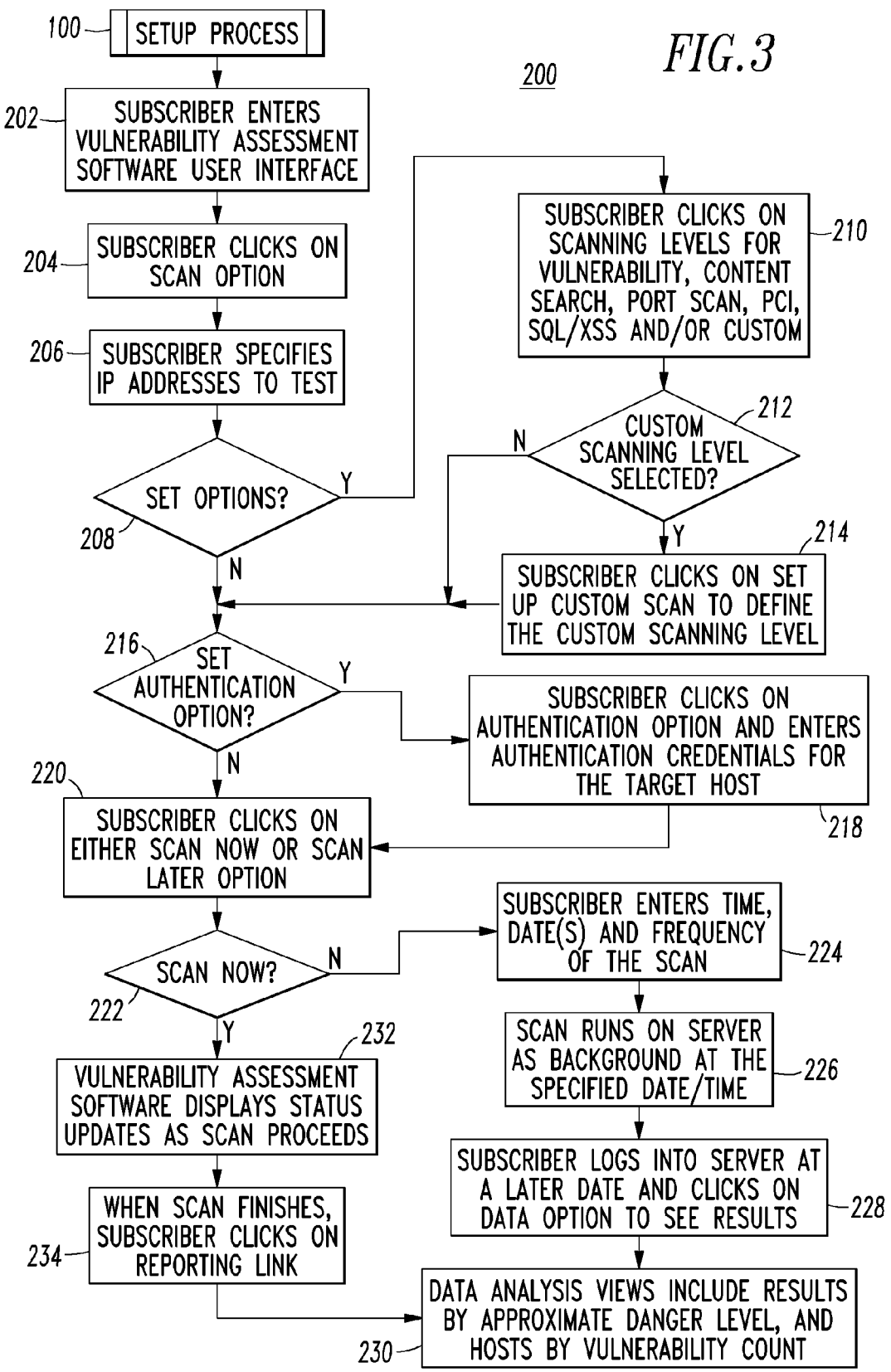
FIG. 3 is a flowchart of vulnerability assessment, web application assessment and content search processes in accordance with an embodiment of the disclosed concept.

Referring to FIG. 3, a routine 200 for vulnerability assessment, web application assessment and content search is shown. This routine 200 follows the setup process 100 of FIG. 2. In the routine 200, at 202, the subscriber enters a vulnerability assessment software user interface (not shown). Next, at 204, the subscriber clicks on a "Scan" option. Then, at 206, the subscriber specifies the number of IP addresses to test. Next, at 208, the user interface determines if the subscriber wishes to set various options for vulnerability scanning. If so, then at 210, the subscriber clicks on "Scanning Levels" and selects a number of scanning levels such as, for example and without limitation, Vulnerability, Content Search, Port Scan, PCI, SQL/XSS and/or Custom. Then, at 212, the user interface determines if the subscriber selected "Custom Scanning Level". If so, then at 214, the subscriber clicks on "Set Up Custom Scan" to define the custom scanning level.

After 214, or if a test failed at either 208 or 212, at 216, the user interface determines if the user wishes to specify authentication credentials for the targets. If so, then at 218, the subscriber clicks on "Authentication" option and enters authentication credentials for a number of target hosts (not shown, but see the number of target hosts 604 of FIG. 7). After 218, or if the test failed at 216, than the subscriber clicks on either a "Scan Now" button or a "Scan Later" button.

Next, at 222, the user interface determines if the subscriber clicked on "Scan Now". If not, and the subscriber clicked on "Scan Later", then at 224, the subscriber enters the time, date(s) and frequency of the scan. Next, at 226, the scan runs on the server in the background at the specified time and date(s). Then at 228, the subscriber logs into the server at a later date (see steps 112 and 122 of FIG. 2) and clicks on a "Data" option. At 230, the subscriber can choose from a variety of data analysis views, including, for example, Results by Approximate Danger Level, and Hosts by Vulnerability Count.

On the other hand, if the user interface determines, at 222, that the subscriber clicked on "Scan Now" at 220, then, at 232, the vulnerability assessment software displays status updates as the scan proceeds. Finally, at 234, when the scan finishes, the subscriber clicks on a "Reporting" link after which step 230 follows.

Figure 4:
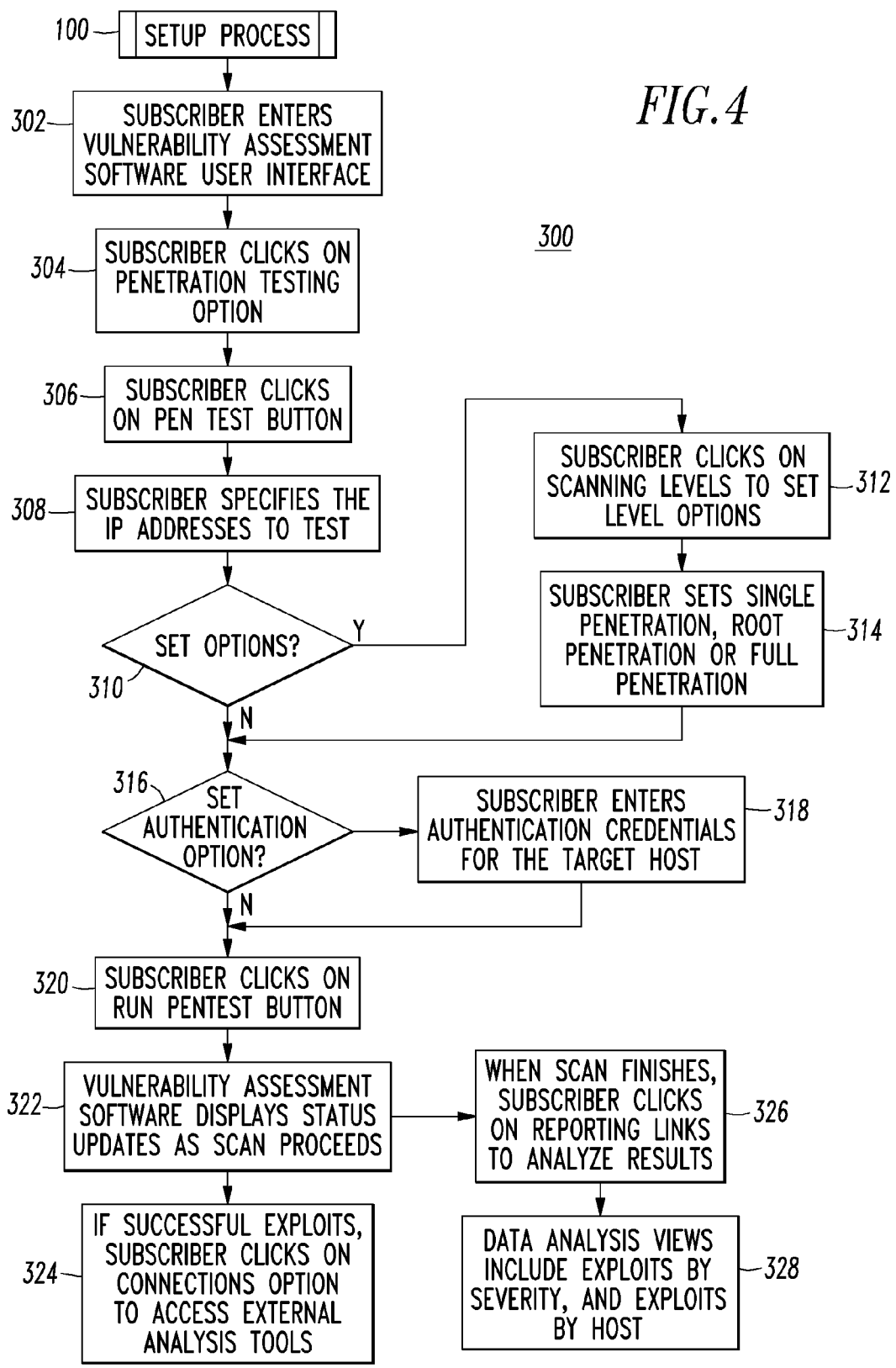
FIG. 4 is a flowchart of an automated penetration testing process in accordance with an embodiment of the disclosed concept.

FIG. 4 shows a routine 300 for automated penetration testing. This routine 300 follows the setup process 100 of FIG. 2. In the routine 300, at 302, the subscriber enters the vulnerability assessment software user interface. Next, at 304, the subscriber clicks on a "Penetration Testing" option. Then, at 306, the subscriber clicks on a "Pen Test" button. Next, at 308, the subscriber specifies the IP addresses to test. Then, at 310, the user interface determines if the subscriber wishes to set various options for penetration testing. If so, then at 312, the subscriber clicks on "Scanning Levels" to set various level options. Next, at 314, the subscriber sets Single Penetration, Root Penetration or Full Penetration.

After 314, or if the subscriber did not wish to set various options for penetration testing at 310, at 316, the user interface determines if the subscriber wishes to optionally set the "Authentication" option by clicking on "Authentication". If so, then at 318, the subscriber enters authentication credentials for the number of target hosts. After 318, or if the test failed at 316, the subscriber clicks on the "Run PenTest" button. Then, at 322, the vulnerability assessment software displays status updates as the penetration testing scan proceeds. After 322, at 324, if there were successful exploits, the subscriber clicks on a "Connections" option to access external analysis tools which can be used with the connections resulting from successful exploits, such as, for example, a command prompt, a file manager, screen capture or tunnel. Also, at 326, when the scan finishes, the subscriber clicks on a "Reporting" link to analyze the results. Then, at 328, the subscriber chooses from a variety of data analysis views, including, for example, Exploits By Severity, and Exploits By Host.

Figure 5A:
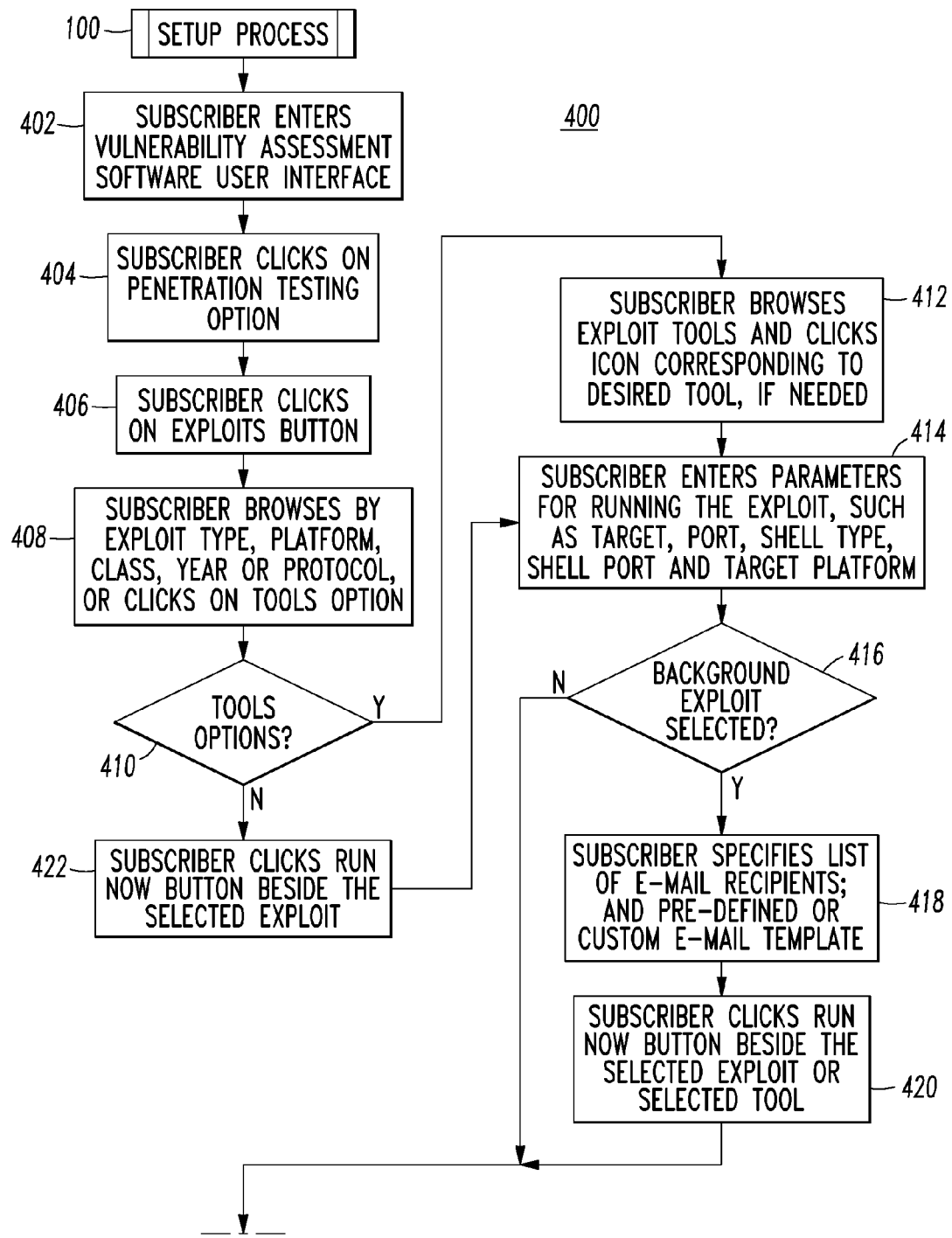
FIGS. 5A-5B form a flowchart of a manual penetration testing process in accordance with an embodiment of the disclosed concept.
Figure 5B:
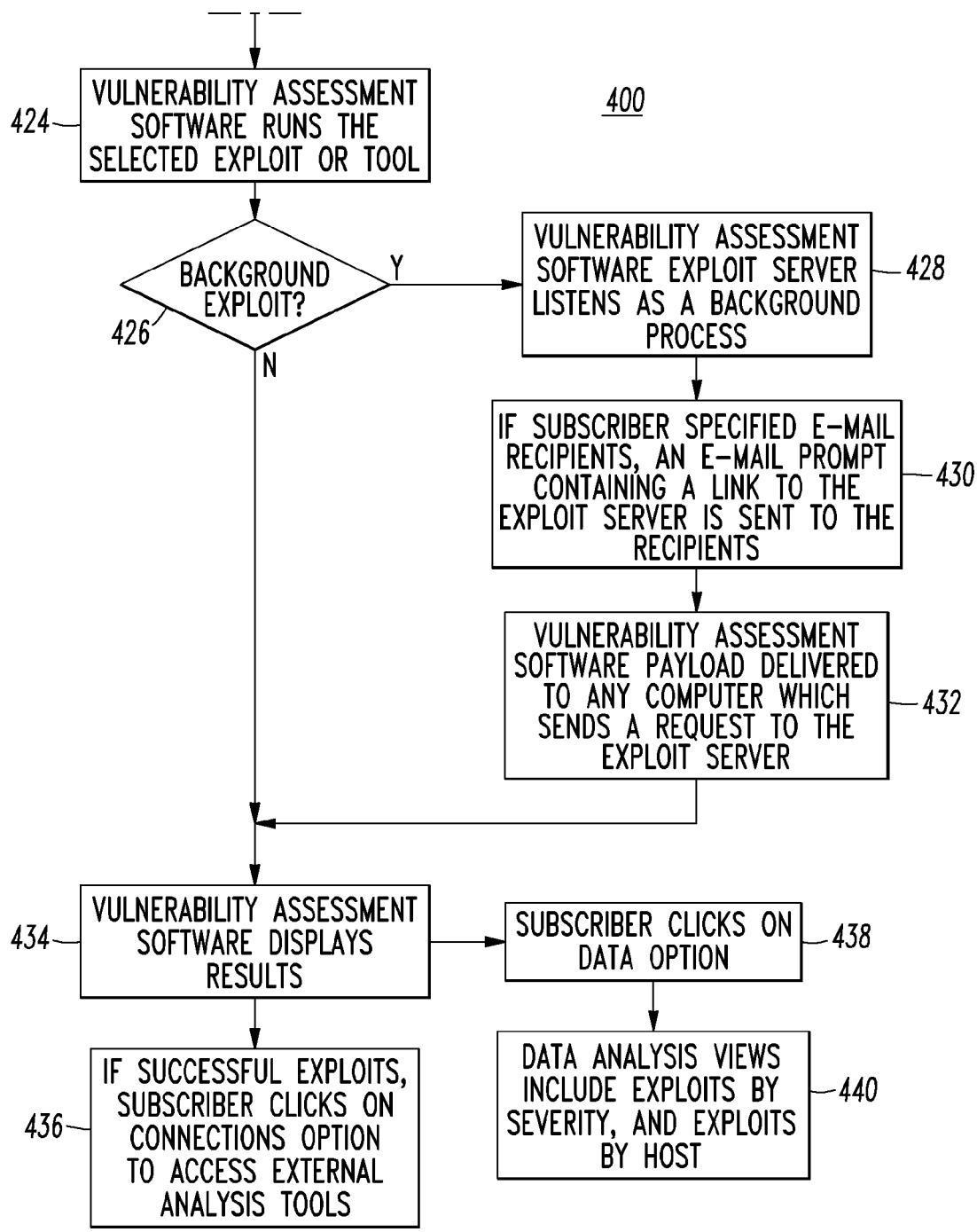

Referring to FIGS. 5A-5B, a routine 400 for manual penetration testing is shown. This routine 400 follows the setup process 100 of FIG. 2. In the routine 400, at 402, the subscriber enters the vulnerability assessment software user interface. Next, at 404, the subscriber clicks on the "Penetration Testing" option. Then, at 406, the subscriber clicks on an "Exploits" button. Next at 408, the subscriber browses by exploit type, platform, class, year or protocol, or clicks on a "Tools" option. At 410, the user interface determines if the subscriber clicked on "Tools".

If so, then at 412, the subscriber browses the exploit Tools and clicks on an icon corresponding to the desired Tool, if needed. Then, at 414, the subscriber enters the parameters for running the exploit or tool, such as the target, port, shell type, shell port and target platform. Next, at 416, the user interface determines if the selected exploit was a Background Exploit (including client exploits and certain exploit tools). If so, then at 418, using the same form as employed at 414, the subscriber specifies a list of e-mail recipients, and a pre-defined or custom e-mail template. Next, at 420, the subscriber clicks on a "Run Now" button beside the selected Exploit or selected Tool.

On the other hand, if the user interface determines that the subscriber did not click on Tools at 410, then at 422, the subscriber clicks on the "Run Now" button beside the selected Exploit, and proceeds to step 414. After 420, or if the test failed at 416, at 424, the vulnerability assessment software runs the selected Exploit or tool. Next, at 426, if the selected Exploit was a background exploit, then at 428, an exploit server (not shown, but see the server 608 of FIG. 7) listens with a background process. Then, at 430, if the subscriber specified e-mail recipients, at 418, then an e-mail prompt containing a link to the exploit server is sent to the recipients. Next, at 432, the vulnerability assessment software exploit payload is delivered to any computer which sends a request to the exploit server (e.g., by a victim user following the link in the e-mail prompt). Then, after 432, or if the selected exploit was a foreground exploit (including remote and local exploits and certain exploit tools) at 426, then at 434, the results are displayed.

After 434, at 436, if there were successful exploits, the subscriber clicks on the "Connections" option to access external analysis tools which can be used with the connections resulting from successful exploits, such as, for example, a command prompt, a file manager, screen capture or tunnel. Also, at 438, when the scan finishes, the subscriber clicks on a "Data" option. Then, at 440, the subscriber chooses from a variety of data analysis views, including, for example, Exploits By Severity, and Exploits By Host.

Figure 6:
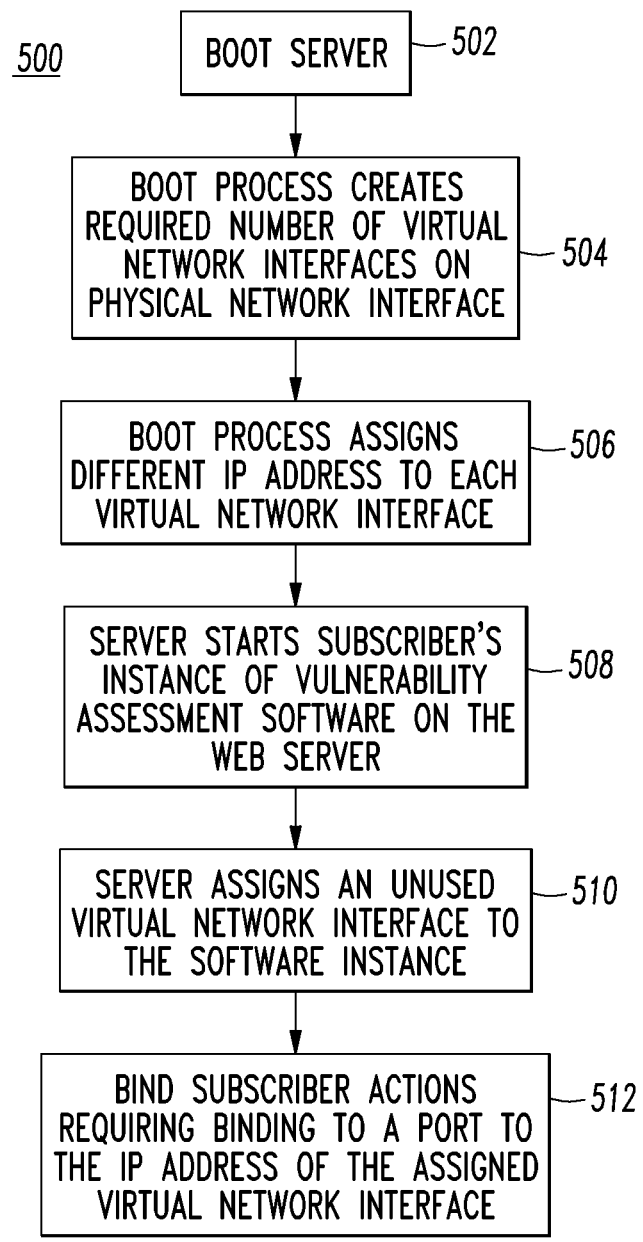
FIG. 6 is a flowchart of a resource sharing process for resolving port binding conflicts in accordance with an embodiment of the disclosed concept.

FIG. 6 shows a resource sharing process 500 for resolving port binding conflicts. The vendor server (not shown, but see the server 608 of FIG. 7) can host separate vulnerability assessment installations for multiple subscribers (not shown, but see the client request host 602 of FIG. 7) as part of the same system (not shown, but see the system 600 of FIG. 7). As a result, there is a need for resource sharing and resource separation features to increase operational efficiency and prevent interference between those installations. For example, the resolution of port binding conflicts is needed because several functions within the vulnerability assessment software (including, for example, reverse-shell exploit payloads, exploit servers, and file transfers) need exclusive access to certain ports in the server.

First, the server boots at 502 of the routine 500. Then, at 504, a server boot process creates a requisite number of virtual network interfaces on its physical network interface, and assigns, at 506, a different IP address to each virtual network interface. Then, at 508, the server starts a new software invocation, which is a subscriber's instance (e.g., see step 124 of FIG. 2; a vulnerability analysis software instance for a subscriber). Next, at 510, the server assigns an unused virtual network interface to the software instance. Finally, at 512, when the subscriber performs an action that requires binding to a port on the server, the server binds that action to the IP address of the assigned virtual network interface.

Example 1

A non-limiting example of a plurality of virtual network interfaces on a physical network interface (e.g., without limitation, an Ethernet network interface) can be two example virtual network interfaces "eth0:0" and "eth0:1" created by a server for an example physical network interface "eth0". A non-limiting example of two unique IP addresses assigned to those respective example virtual network interfaces can be "10.0.0.1" and "10.0.0.2". For example, a first user logs in and his/her software instance is assigned "10.0.0.1", and a second user logs in and his/her software instance is assigned "10.0.0.2". Here, the virtual network interface "eth0:0" is assigned to the first user's software instance on the server, and the virtual network interface "eth0:1" is assigned to the second user's software instance on the server. Subsequently, for any action requiring binding to one of a plurality of ports of the server, the server responsively binds the action to the unique IP address (e.g., "10.0.0.1"; "10.0.0.2") of the corresponding one of the virtual network interfaces (e.g., "eth0:0"; "eth0:1").

Example 2

A first user runs an exploit which listens for shell connections on port 10000 on IP address 10.0.0.1 (virtual network interface eth0:0). A second user runs an exploit which listens for shell connections on port 10000 on IP address 10.0.0.2 (virtual network interface eth0:1). Since the two instances bind to different virtual network interfaces, there is no conflict.

Example 3

A first user runs an exploit server which listens for HTTP requests on port 8000 on IP address 10.0.0.1 (virtual network interface eth0:0). A second user runs an exploit server which listens for HTTP requests on port 8000 on IP address 10.0.0.2 (virtual network interface eth0:1). Since the two instances bind to different virtual network interfaces, there is no conflict.

Figure 7:
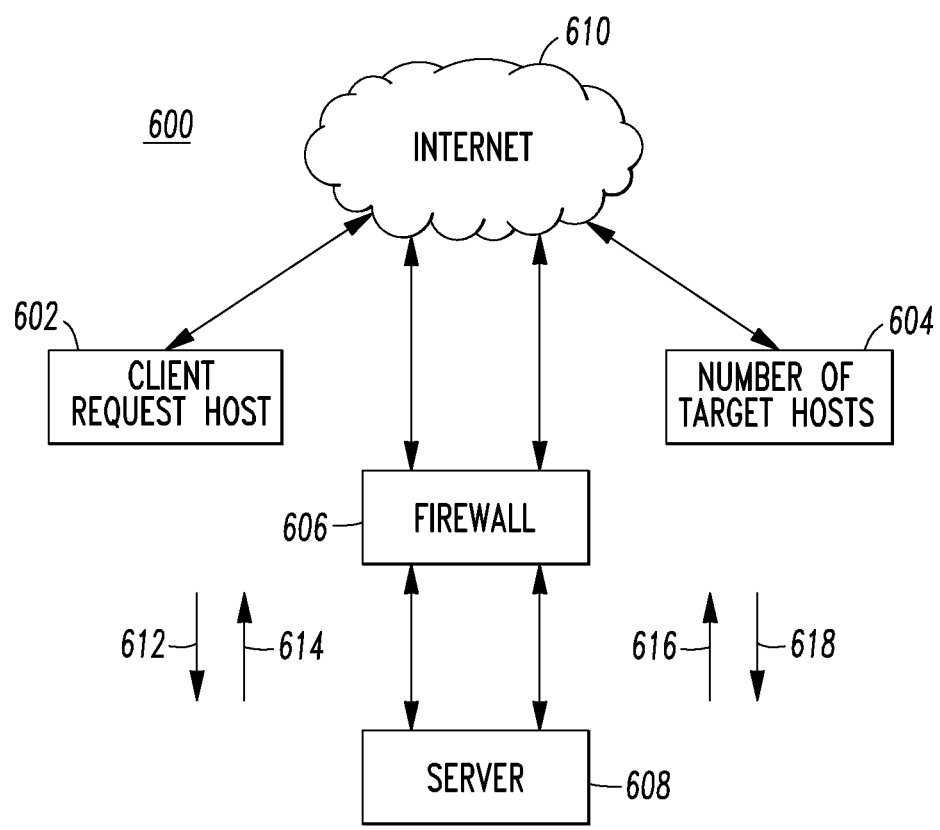
FIG. 7 is a block diagram of a vulnerability assessment system in accordance with an embodiment of the disclosed concept.

FIG. 7 shows a vulnerability assessment system 600 including a client request host 602, a number of target hosts 604, a firewall 606, and a server 608, which are interconnected via the Internet 610, as shown. The server 608 can execute the routines 100,200,300,400,500 of respective FIGS. 2, 3, 4, 5A-5B and 6. The client request host 602 provides client requests 612 to the server 608, and the server 608 provides scan/exploit results 614 back to the client request host 602. Although one client request host 602 is shown, it will be appreciated that the server 608 can serve multiple different client systems (not shown). The server 608 provides client-directed probes and exploits against the number of target hosts 604, and the number of target hosts 604 return corresponding results 618 back to the server. As is conventional, the firewall 606 is disposed between the server 608 and the Internet 610. Although one server 608 is shown, it will be appreciated that any suitable number of servers can be employed.

The disclosed concept can be applied to a wide range of vulnerability assessment applications, such as for example and without limitation, vulnerability scanning, PCI scanning, web application scanning, penetration testing, network discovery-unlimited targets, content scanning, social engineering, phishing assessment, anti-virus information assessment and web spidering.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of remote vulnerability assessment by a server for a subscriber at a client system, said method comprising:
    accepting credentials of the subscriber at the client system and responsively granting access to an account manager on the server;
    generating by the server a license key operatively associated with the remote vulnerability assessment for the subscriber;
    providing the license key to the client system;
    accepting input at the server from the client system, the input: (i) redirecting the subscriber to the server and automatically providing the license key back to the server, and (ii) requesting a user interface for running remote vulnerability assessments;
    responsive to receiving the input, determining a first time log on by the subscriber and responsively creating a software instance of vulnerability analysis software at the server;
    responsive to receiving the input, starting the software instance of vulnerability analysis software at the server;
    synchronizing the license key between the account manager and the server;
    synchronizing the credentials between the account manager and the server;
    responsive to synchronizing the license key and synchronizing the credentials, activating the software instance of the vulnerability analysis software at the server including copying the license key from the account manager to the software instance of the vulnerability analysis software;
    authenticating the subscriber and redirecting the client system to the user interface; and
    providing vulnerability assessment, web application assessment and content search from the software instance.

2. The method of claim 1 further comprising:
    employing one of a plurality of subscribers as said subscriber; and
    employing one of a plurality of vulnerability assessment installations as said software instance on the server.

3. The method of claim 1 further comprising:
    determining by the server if the subscriber has a static license; and
    accepting input at the server of a number of IP addresses to test by the server.

4. The method of claim 3 further comprising:
    employing a number of network addresses or host addresses as said number of IP addresses.

5. The method of claim 1 further comprising:
    employing an account login ID and a password as said credentials.

6. The method of claim 1 further comprising:
    providing one of automated penetration testing and manual penetration testing from the software instance.

7. A system comprising:
    a client system;
    a server with a hardware processor; and
    a communication network providing communications between said client system and said server,
    said server being structured to provide remote vulnerability assessment for a subscriber at the client system,
    said server being further structured to accept credentials of the subscriber at the client system and responsively grant access to an account manager on the server,
    said server being further structured to generate a license key operatively associated with the remote vulnerability assessment for the subscriber and provide the license key to the client system, and
    said server being further structured to accept input from the client system, the input: (i) redirecting the subscriber to the server and automatically providing the license key back to the server, and (ii) requesting a user interface for running remote vulnerability assessments, responsive to receiving the input, determine a first time log on by the subscriber from the client system and responsively create a software instance of vulnerability analysis software, start the software instance of vulnerability analysis software, synchronize the license key between the account manager and the server, synchronize the credentials between the account manager and the server, responsive to synchronizing the license key and synchronizing the credentials, activate the software instance of the vulnerability analysis software at the server including copying the license key from the account manager to the software instance of the vulnerability analysis software, authenticate the subscriber and redirect the client system to the user interface, and provide vulnerability assessment, web application assessment and content search from the software instance.

8. The system of claim 7 wherein said remote vulnerability assessment includes vulnerability analysis, penetration testing and content searching activities from the server.

9. The system of claim 7 wherein said server is further structured to determine if the subscriber has a static license, and accept input of a number of IP addresses to test by the server.

10. The system of claim 9 wherein said number of IP addresses correspond to a plurality of target hosts.

11. The system of claim 7 wherein said server is further structured to provide one of automated penetration testing and manual penetration testing from the software instance.

12. A method of remote vulnerability assessment by a server for a subscriber at a client system, said method comprising:
    accepting credentials of the subscriber at the client system and responsively granting access to an account manager on the server;
    generating by the server a license key operatively associated with the remote vulnerability assessment for the subscriber;
    providing the license key to the client system;

accepting input at the server from the client system, the input: (i) redirecting the subscriber to the server and automatically providing the license key back to the server, and (ii) requesting a user interface for running remote vulnerability assessments;

responsive to receiving the input, determining a first time log on by the subscriber and responsively creating a software instance of vulnerability analysis software at the server;

responsive to receiving the input, starting the software instance of vulnerability analysis software at the server;

synchronizing the license key between the account manager and the server;

synchronizing the credentials between the account manager and the server;

responsive to synchronizing the license key and synchronizing the credentials, activating the software instance of the vulnerability analysis software at the server including copying the license key from the account manager to the software instance of the vulnerability analysis software;

authenticating the subscriber and redirecting the client system to the user interface; and providing one of automated penetration testing and manual penetration testing from the software instance.

13. A system comprising:

a client system;

a server with a hardware processor; and a communication network providing communications between said client system and said server, said server being structured to provide remote vulnerability assessment for a subscriber at the client system, said server being further structured to accept credentials of the subscriber at the client system and responsively grant access to an account manager on the server, said server being further structured to generate a license key operatively associated with the remote vulnerability assessment for the subscriber and provide the license key to the client system, and said server being further structured to accept input from the client system, the input: (i) redirecting the subscriber to the server and automatically providing the license key back to the server, and (ii) requesting a user interface for running remote vulnerability assessments, responsive to receiving the input, determine a first time log on by the subscriber from the client system and responsively create a software instance of vulnerability analysis software, start the software instance of vulnerability analysis software, synchronize the license key between the account manager and the server, synchronize the credentials between the account manager and the server, responsive to synchronizing the license key and synchronizing the credentials, activate the software instance of the vulnerability analysis software at the server including copying the license key from the account manager to the software instance of the vulnerability analysis software, authenticate the subscriber and redirect the client system to the user interface, and provide one of automated penetration testing and manual penetration testing from the software instance.

* * * * *